United States Patent
Kwon et al.

(10) Patent No.: US 9,008,863 B2
(45) Date of Patent: Apr. 14, 2015

(54) VEHICLE INSTRUMENT PANEL APPARATUS AND CONTROL METHOD THEREOF

(71) Applicant: Electronics and Telecommunications Research Institute, Daejeon-si (KR)

(72) Inventors: Seung-Joon Kwon, Seoul (KR); Moon-Soo Lee, Daejeon-si (KR); Min-Jung Kim, Daejeon-si (KR); Sun-Joong Kim, Daejeon-si (KR); Kee-Seong Cho, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

(21) Appl. No.: 13/953,004

(22) Filed: Jul. 29, 2013

(65) Prior Publication Data

US 2014/0200743 A1  Jul. 17, 2014

(30) Foreign Application Priority Data

Jan. 17, 2013 (KR) .......................... 10-2013-0005350

(51) Int. Cl.
- *G06D 1/00* (2006.01)
- *B60K 35/00* (2006.01)
- *H04L 29/06* (2006.01)

(52) U.S. Cl.
CPC ............ *B60K 35/00* (2013.01); *H04L 63/08* (2013.01); *B60K 2350/1096* (2013.01)

(58) Field of Classification Search
USPC ............................................................ 701/2
See application file for complete search history.

(56) References Cited

U.S. PATENT DOCUMENTS

| | | | | |
|---|---|---|---|---|
| 6,434,450 | B1* | 8/2002 | Griffin et al. | 701/1 |
| 6,812,942 | B2* | 11/2004 | Ribak | 345/30 |
| 2005/0177287 | A1* | 8/2005 | Wang et al. | 701/36 |
| 2007/0069880 | A1* | 3/2007 | Best et al. | 340/461 |
| 2010/0127847 | A1* | 5/2010 | Evans et al. | 340/461 |
| 2011/0175754 | A1* | 7/2011 | Karpinsky | 340/963 |
| 2011/0208339 | A1* | 8/2011 | Tarte et al. | 700/98 |
| 2013/0154922 | A1* | 6/2013 | Ferren et al. | 345/156 |
| 2013/0179029 | A1* | 7/2013 | Wang et al. | 701/32.7 |
| 2014/0046468 | A1* | 2/2014 | Tarte et al. | 700/97 |
| 2014/0200743 | A1* | 7/2014 | Kwon et al. | 701/2 |

FOREIGN PATENT DOCUMENTS

| KR | 10-2010-0093242 | 8/2010 |
|---|---|---|
| KR | 10-2011-0076921 | 7/2011 |

* cited by examiner

*Primary Examiner* — Hussein A. Elchanti
(74) *Attorney, Agent, or Firm* — Nelson Mullins Riley & Scarborough LLP; Anthony A. Laurentano, Esq.

(57) ABSTRACT

A vehicle instrument panel apparatus includes a communication unit configured to receive a widget or content transmitted from one or more user terminals, an instrument panel page constituted of a plurality of instrument panel containers in which the widget or content is embedded, a converting unit configured to generate data capable of being embedded in the instrument panel containers according to a type of the received widget or content, an execution unit configured to load the instrument panel page to a screen, a sensing data acquiring unit configured to acquire measurement information input through one or more sensors, and an interface unit configured to combine the measurement information acquired by the sensing data acquiring unit with the instrument panel page loaded by the execution unit.

6 Claims, 5 Drawing Sheets

VEHICLE INSTRUMENT PANEL APPARATUS AND CONTROL METHOD THEREOF

CROSS-REFERENCE TO RELATED APPLICATION

This application claims the benefit under 35 U.S.C. §119(a) of Korean Patent Application No. 10-2013-0005350, filed on Jan. 17, 2013, the entire disclosure of which is incorporated herein by reference for all purposes.

BACKGROUND

1. Field

The following description relates to a vehicle instrument panel apparatus and a control method thereof, and more particularly, to a vehicle instrument panel apparatus for enabling a widget and application content to be transferred and shared between a mobile terminal and a vehicle instrument panel, and a control method thereof.

2. Description of the Background

In recent vehicle development trends, an interest in and importance on an external design and an infotainment system of a vehicle have increased in addition to the most essential mobility and high-quality riding comfort of the vehicle. The infotainment system and its component functions have emerged as an obvious identity between vehicle brands.

An owner of a vehicle desires to use the vehicle for commuting on weekdays and for a family outing on weekends. An unmarried vehicle owner wants the vehicle which provides a high-performance function or good moods. Thus, the desire of the vehicle owner wanting to own one or more other vehicles is satisfied to a certain extent with tuning of an external appearance. The vehicle owner desires to have a vehicle differentiated from the same model of vehicles. However, it is difficult to make a change in the interior of the vehicle through the tuning of the external appearance of the vehicle.

However, under a situation in which the recent technical development trends related to vehicle information and communication technology (ICT) convergence are coupling and cooperation of an application with a mobile device (a smartphone, a pad, or an integrated tablet personal computer (PC), or the like), the desires of the vehicle owners who want to decorate their own unique interiors in at least the interior of the vehicle may be satisfied with the implementation of a head-up display (HUD) function using a mobile device application, a vehicle cooperation system using a mobile device, or a combination with ICT using a mobile device for a function control.

Under a situation in which the vehicle owner using the mobile device wants to use a vehicle with a design or function reflecting his/her own preference in combination with ICT convenient from the viewpoint of a driver, an infotainment technology concept may be combined with cloud application service technology or the like through convergence of vehicle-ICT technology in a so-called smart car concept.

In case of the interior of the vehicle, a vehicle instrument panel is generally installed at a position in the front of a driver's seat according to a type, arrangement, and design of instruments designed and set by a vehicle manufacturer in advance. The vehicle instrument panel includes an odometer indicating a running speed of the vehicle and traveling distance information (a possible traveling distance and a total traveled distance), a speedometer of revolutions per minute (RPM) of the vehicle engine, a fuel gauge, an oil pressure gauge, a water temperature gauge, gear shift information, traveling selection mode (sports mode, comfort mode, etc.) information, operation state indications/alarm information of various devices, and the like.

A display type of the vehicle instrument panel is classified into an analog type and a digital type. In case of the vehicle instrument panel using only the analogy type using an indicator or an indication lamp, there is a disadvantage in that only a fixed design and limited information set by a vehicle manufacturer are given regardless of a driver's preference.

The digital type is a type in which an indication is represented by numerical characters or text. Even in the instrument panel to which only the digital type is applied or a combination of the analog and digital schemes is applied, only a design form and information set by a vehicle manufacturer are provided to the driver.

That is, there is a problem in that the vehicle instrument panel to which a concept of the existing analog and digital types is applied has a fixed form, the driver is easily bored with the limited and fixed design and information when the instrument panel is used for a long time, and the driver's preference is not reflected in the instrument panel.

Recently, a liquid crystal display part has been added or extended and applied to the vehicle instrument panel, so that vehicle state information has been provided in several colors and forms preset by the vehicle manufacturer, and some operation screen elements in cooperation with navigation have been represented in the liquid crystal display part.

However, because there are provided a design and information input and set by the vehicle manufacturer in advance regardless of the driver's preference, it is difficult to satisfy the desire of the driver who wants to decorate at least the interior of the vehicle through a combination of ICT. Also, it is difficult to change the overall design of the instrument panel including a partial liquid crystal display widely used in the vehicle without physically changing a vehicle structure. The instrument panel including the partial liquid crystal display provides only limited safe driving information and state information of the vehicle.

This means that it is difficult to simultaneously display all driving-related information that should be provided to a specific driver. Thus, because this causes the driver to operate a device in motion, there is a problem in that the driver's eyes are distracted and the safety and efficiency of the driving are reduced, resulting in limitation of compatibility with a mutual interaction technology application between a vehicle and a driver using a mobile device (a smartphone, a pad, or an integrated tablet PC, or the like) most widely available to drivers in the ICT field.

SUMMARY

The following description relates to a method of monitoring and sharing traveling information/driving state information or the like of a vehicle for safe driving by enabling a widget and content to be transmitted to other specific vehicle instrument panels or a web browsing-enabled screen device at another position rather than a single fixed specific vehicle instrument panel through a mobile device connected to the Internet.

In one general aspect, there is provided a vehicle instrument panel apparatus including: a communication unit configured to receive a widget or content transmitted from one or more user terminals; an instrument panel page constituted of a plurality of instrument panel containers in which the widget or content is embedded; a converting unit configured to generate data capable of being embedded in the instrument panel containers according to a type of the received widget or content; an execution unit configured to load the instrument panel page to a screen; a sensing data acquiring unit configured to acquire measurement information input through one or more sensors; and an interface unit configured to combine the measurement information acquired by the sensing data acquiring unit with the instrument panel page loaded by the execution unit.

In another general aspect, there is provided a method of controlling a vehicle instrument panel through sharing with a user terminal in a vehicle instrument panel apparatus, including: receiving a widget or content transmitted from one or more user terminals; performing conversion into data capable of being embedded in one or more instrument panel containers constituting an instrument panel page according to a type of the received widget or content; loading the instrument panel page to a screen; acquiring measurement information of the vehicle input through one or more sensors; and combining the acquired measurement information with the instrument panel page loaded to the screen.

It is to be understood that both the foregoing general description and the following detailed description are exemplary and explanatory and are intended to provide further explanation of the invention as claimed. Other features and aspects will be apparent from the following detailed description, the drawings, and the claims.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The following description relates to an apparatus and method for configuring a customized instrument panel screen by controlling an instrument widget (hereinafter referred to as "widget") or application content (hereinafter referred to as "content") to be transferred and shared before or when a vehicle is started using a mobile device connected to an Internet network anytime and anywhere.

A driver with red-green color blindness capable of acquiring a driver's license will smoothly use an instrument panel screen represented in colors different from red and green. That is, it is possible to configure a customized instrument panel using an instrument panel apparatus and a control method thereof as proposed in the present invention without using an original color and form of an instrument panel provided by a vehicle manufacturer.

Figure 1:
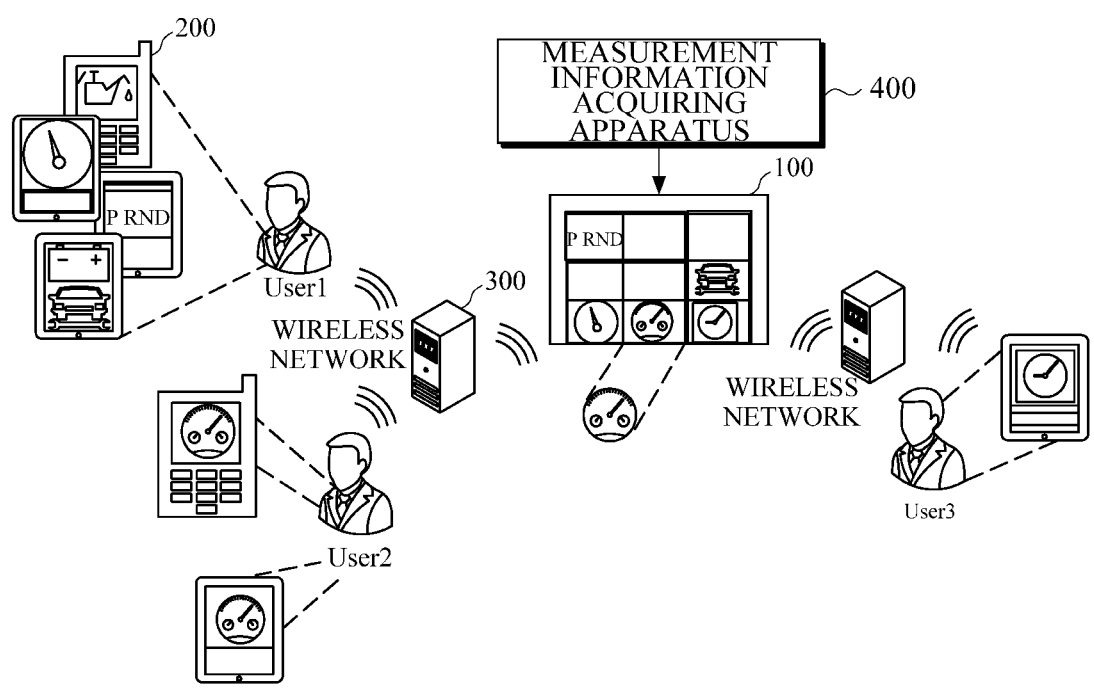
FIG. 1 is a configuration diagram illustrating an example of a system including a vehicle instrument panel apparatus.

FIG. 1 is a configuration diagram illustrating an example of a system including a vehicle instrument panel apparatus.

Referring to FIG. 1, the system includes the vehicle instrument panel apparatus 100, one or more user terminals 200, a relay server 300, and a measurement information acquiring apparatus 400.

The vehicle instrument panel apparatus 100 outputs measurement information according to a state of the vehicle to a display panel. The display panel may be of a type of plasma, liquid crystal, projection, or the like.

In the vehicle instrument panel apparatus 100, instrument panel information, design, and user interface (UI) forms are variable according to a selective input of a driver or a related person. For this, the vehicle instrument panel apparatus 100 receives and executes a widget or content transmitted from the user terminal 200 held by a specific vehicle driver or a related person.

As an application of the form of a web application operable based on a web, the widget includes a gasoline mileage representation application, a navigation application, a global positioning system (GPS) layout application, a speed/torque layout-related application, a vehicle revolutions per minute (RPM) application, and a safe driving-related warning application.

Then, the vehicle instrument panel apparatus 100 shares the executed widget or content with the user terminal 200, and controls a vehicle state of a screen of the vehicle instrument panel apparatus 100, various information content configurations, design forms, or a UI arrangement according to input information from the user terminal 200.

Measurement information acquired by the measurement information acquiring apparatus 400 serving as a device for acquiring various state information of the vehicle is combined with the widget or content and represented as a resulting value on a screen of the vehicle instrument panel apparatus 100.

In addition, the screen of the vehicle instrument panel apparatus 100 is the form of a hypertext markup language (HTML) web page operable on a web browser. In addition, a unit or overall layout arrangement of the vehicle instrument panel apparatus 100 may be preset before traveling or may be set by the transfer of a widget or content. The content to be used in the vehicle instrument panel apparatus 100 may be held by a user or may include a web page operating on a web. Also, the vehicle instrument panel apparatus 100 may be constructed on one specific vehicle or the same constructed vehicle instrument panel may also be constructed in a different place, time, and vehicle.

The user terminal 200 may join a specific vehicle instrument panel and various content configuration operations on the instrument panel or monitor and share vehicle running information and driving state information and the like for safety while the user transmits or receives a widget or content by accessing the vehicle instrument panel apparatus 100 of a monitor form. That is, when a vehicle driver or a related person uses a mobile device, a widget or content is transferred to and shared with the vehicle instrument panel apparatus 100 when a mood change in the interior of the vehicle is desired, when the driver wants to concentrate on driving even in a cloudy weather, or when a change in a design and a UI arrangement represented based on information contents about a traveling environment is desired.

In addition, when the user terminal 200 is connected to the vehicle instrument panel apparatus 100, data may be transmitted and received via the relay server 300. Data may be transmitted and received by directly connecting to the vehicle instrument panel apparatus 100 through a short-distance communication scheme such as near field communication (NFC) instead of a wireless Internet communication network.

The relay server 300 controls connectivity maintenance and management and data transmission and reception necessary for a widget or content transfer between the vehicle instrument panel apparatus 100 and the user terminal 200 or between two or more user terminals 200. The user terminal 200 is subjected to an authentication process for an access right in the relay server 300 through a wireless network and accesses the vehicle instrument panel apparatus 100 connected to a network.

The relay server 300 is configured to enable a registration/correction/deletion process to be performed on the right to join a content configuration operation on a specific vehicle instrument panel on a web interface and share a content configuration-related widget and application content information.

The relay server 300 performs a function of maintaining and managing information about the user terminal 200 joining an operation of configuring contents of a vehicle instrument panel, storing information necessary to transfer a widget or content between the user terminals 200 temporarily or for a predetermined period, and transferring the stored information. State information during traveling may be linked to the widget or content stored in the relay server 300 and used as the purpose for monitoring and safe driving. In addition, a standardized web protocol is used for data transmission and reception and connection management between the user terminal 200 and the relay server 300. A standardized web protocol is also used for data transmission and reception and connection management between the relay server 300 and the vehicle instrument panel apparatus 100.

Also, the relay server 300 can be configured such that a represented instrument panel shape, instrument panel configuration contents, or an arranged widget and content are transferred to another user terminal 200 for the purpose of monitoring and safe driving and the like.

Figure 2:
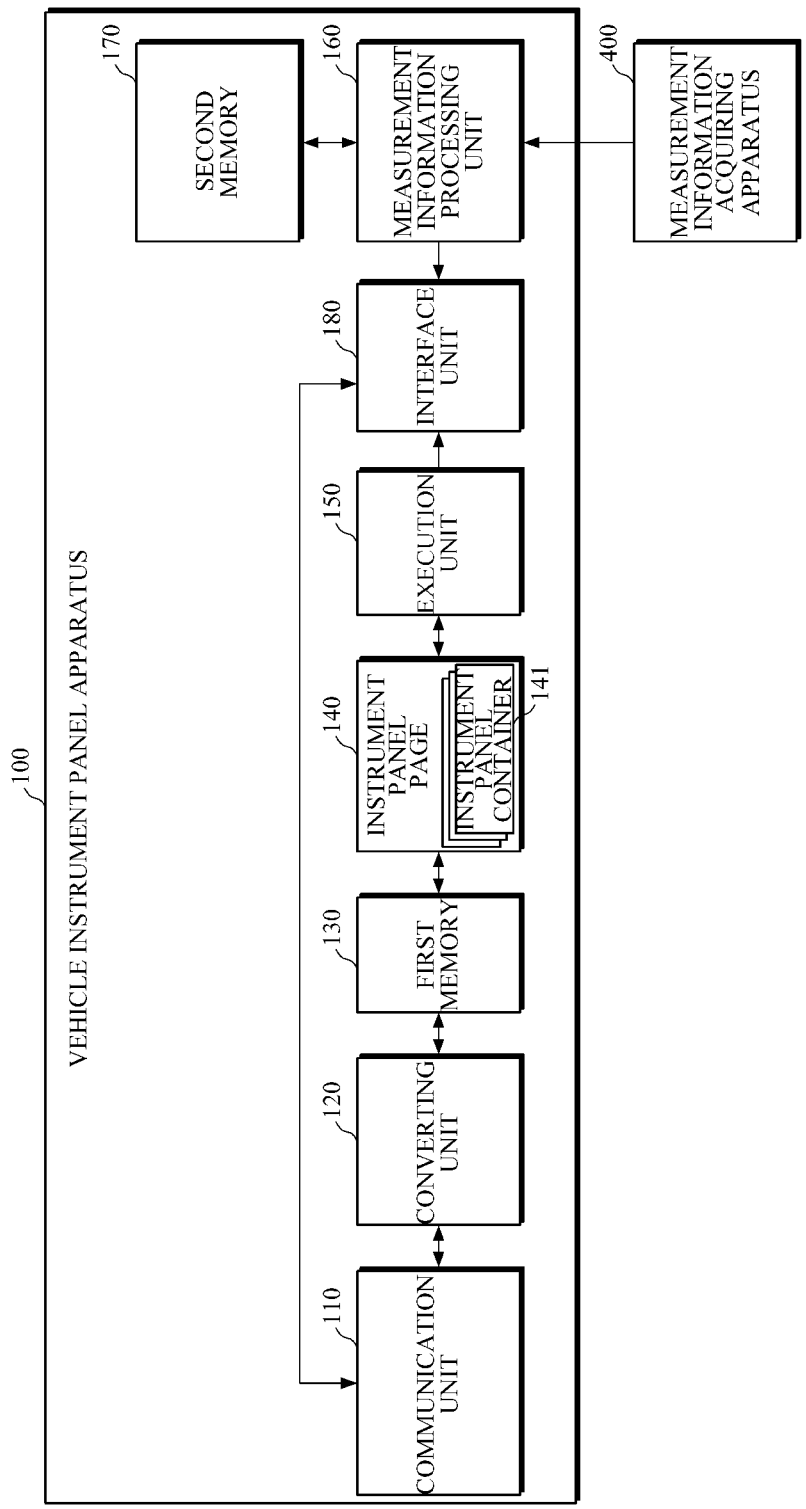
FIG. 2 is a detailed configuration diagram of the vehicle instrument panel apparatus.

FIG. 2 is a detailed configuration diagram of the vehicle instrument panel apparatus.

The vehicle instrument panel apparatus 100 includes a communication unit 110, a converting unit 120, a first memory 130, an instrument panel page 140, an execution unit 150, a measurement information processing unit 160, a second memory 170, and an interface unit 180.

The communication unit 110 receives the widget or content transmitted from one or more user terminals 200 through the relay server 300. In addition, widget or content display state information is transferred to one or more user terminals 200.

The converting unit 120 converts the widget or content received through the communication unit 110 so that the widget or content is available in an instrument panel page 140, and stores the converted widget or content in the first memory 130. That is, a function of generating data capable of being embedded in an instrument panel container 141 according to a type of widget or content is provided.

The first memory 130 stores a widget or content of a form capable of being embedded in the instrument panel container 141 through the converting unit 120.

The instrument panel page 140 is constituted of a plurality of instrument panel containers 141, and the instrument panel container 141 is a unit component of the vehicle instrument panel page 140 designed to enable common functions necessary for configuring a personalized vehicle instrument panel apparatus 100 to be performed. While this instrument panel container 141 is generated, it is possible to transfer and share a widget or content. Accordingly, it is possible to configure a web browser-compatible instrument panel apparatus in which various content configurations through an instrument panel and a personalized vehicle instrument panel configuration are possible by controlling various widgets and content to be transferred and shared between the mobile terminals 200 in the vehicle instrument panel apparatus 100 which is represented in only simple analog or digital measuring instrument shapes whose number and forms are fixed in the related art.

In the instrument panel container 141, an application including all of a web application, a widget, and the like executable on a web browser may be executed.

The execution unit 150 loads the instrument panel page 140 to an overall screen of the instrument panel of a monitor form. That is, the widget and content are caused to be executed on the instrument panel screen.

The measurement information processing unit 160 stores vehicle measurement information transmitted from the measurement information acquiring apparatus 400 in the second memory 170 and loads the measurement information to the interface unit 180.

The second memory 170 temporarily stores the measurement information received from the measurement information acquiring apparatus 400.

The interface unit 180 causes web application programming interfaces (APIs) related to a specific widget or content combination transferred from the user terminal 200 to operate in cooperation with each other, so that a unit measuring instrument, a measuring instrument combination, a vehicle state information/driving information UI, and the like represented on the screen of the vehicle instrument panel apparatus 100 actually operate on the web browser. On the other hand, the unit measuring instrument, the measuring instrument combination, the vehicle state information/driving information UI, and the like represented on the screen of the vehicle instrument panel apparatus 100 are shared with a user terminal 200 of another user or a related person.

Figure 3:
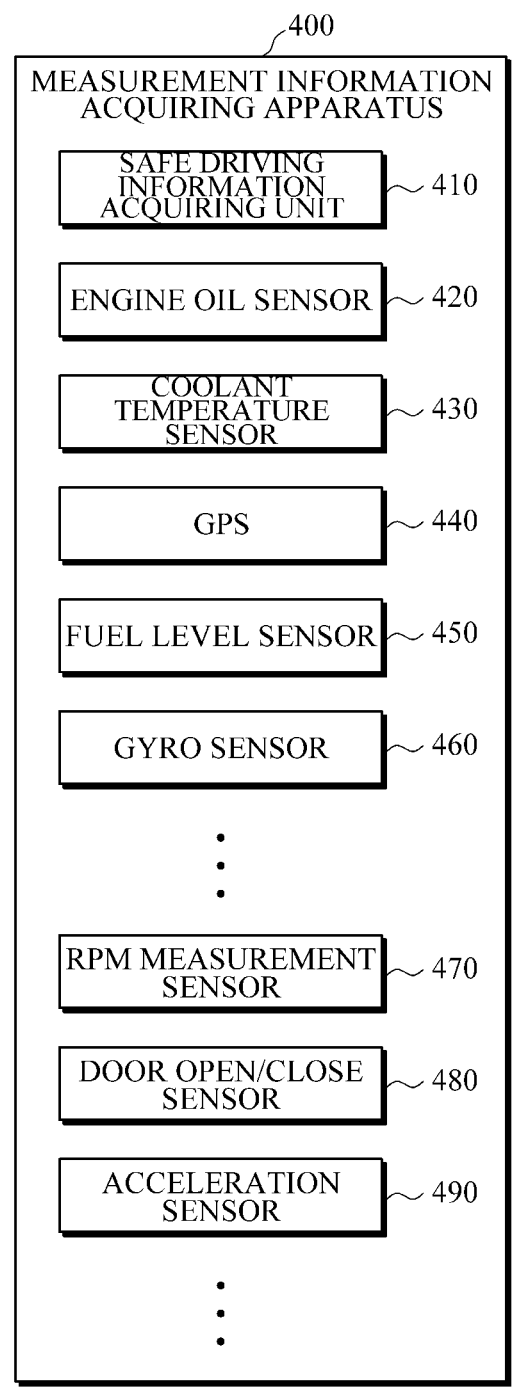
FIG. 3 is a configuration diagram illustrating an example of a measurement information acquiring apparatus.

FIG. 3 is a configuration diagram illustrating an example of the measurement information acquiring apparatus.

The measurement information acquiring apparatus 400 provides various measurement information generated according to running of the vehicle and information necessary for the traveling, and may include sensors. According to the example, the measurement information acquiring apparatus 400 includes at least one of a safe driving information acquiring unit 410, an engine oil sensor 420, a coolant temperature sensor 430, a GPS sensor 440, a fuel level sensor 450, a gyro sensor 460, an RPM measurement sensor 470, a door open/close sensor 480, and an acceleration sensor 490.

Figure 4:
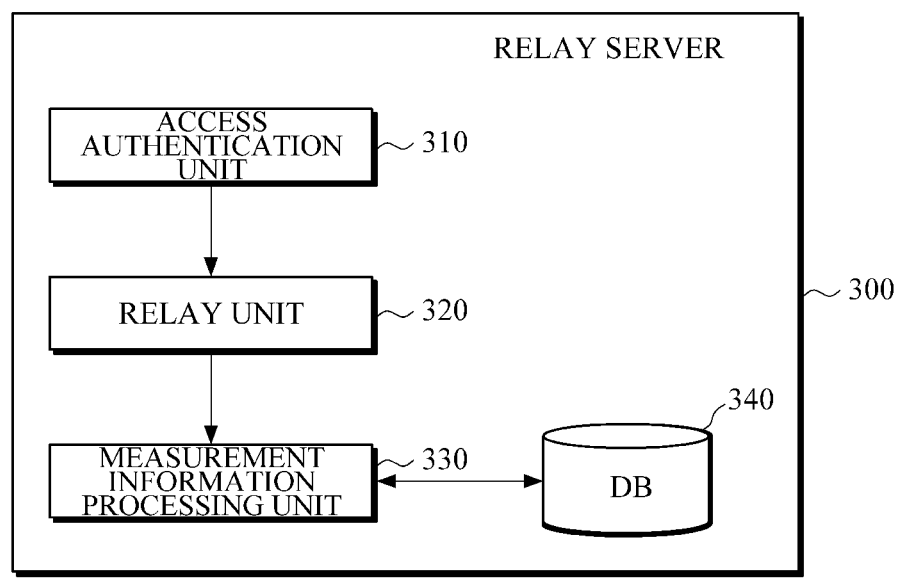
FIG. 4 is a configuration diagram illustrating an example of a relay server.

FIG. 4 is a configuration diagram illustrating an example of the relay server.

Referring to FIG. 4, the relay server 300 includes an access authentication unit 310, a relay unit 320, a measurement information processing unit 330, and a database (DB) 340.

The access authentication unit 310 performs an authentication process for an access right according to an access request from one or more user terminals 200 to the vehicle instrument panel apparatus 100. The user terminal 200 authenticated by the authentication process may access the vehicle instrument panel apparatus 100.

The relay unit 320 performs a relay operation so that the user terminal 200 of which the access has been authenticated is connected to the vehicle instrument panel apparatus 100 connected to a network. That is, a widget or content held or retrieved by the user terminal 200 is caused to be transferred to the vehicle instrument panel apparatus 100. In addition, the relay unit 320 relays a widget or content transfer between user terminals.

The measurement information processing unit 330 may be configured so that a represented instrument panel shape, instrument panel configuration contents, or an arranged widget and content are transferred to another user terminal 200 for the purpose of monitoring and safe driving or are stored in the DB 340.

The DB 340 stores the represented instrument panel shape, the instrument panel configuration contents, or the arranged widget and content. Because state information during traveling is linked to the stored widget or content, the state information during the traveling is used for the purpose of monitoring and safe driving.

Figure 5:
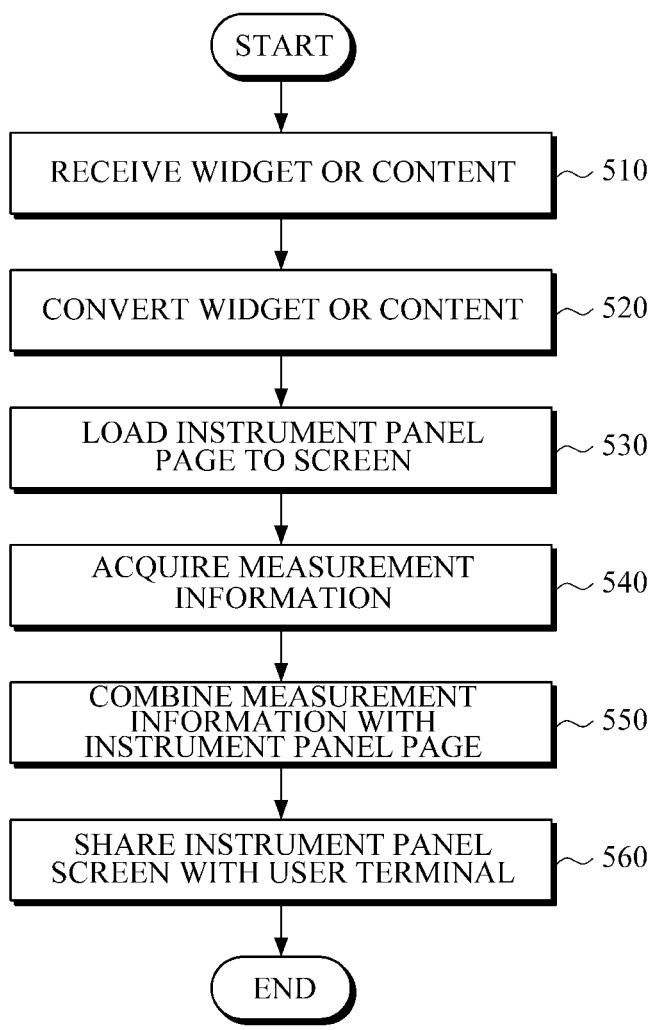
FIG. 5 is a flowchart illustrating an example of a method of controlling the vehicle instrument panel.

FIG. 5 is a flowchart illustrating an example of a method of controlling the vehicle instrument panel.

Referring to FIG. 5, the vehicle instrument panel apparatus 100 receives a widget or content transmitted from one or more user terminals 200 in operation 510.

In operation 520, the vehicle instrument panel apparatus 100 converts the received widget or content so that the widget or content is available in the instrument panel page 140. That is, a function of generating data capable of being embedded in an instrument panel container according to a type of the widget or content is provided. In the instrument panel container, an application including all of a web application, a widget, and the like executable on a web browser can be executed. The instrument panel page is constituted of a plurality of instrument panel containers, and the instrument panel container is a unit component of the vehicle instrument panel page designed to enable common functions necessary for configuring a personalized vehicle instrument panel apparatus 100 to be performed. While this instrument panel container is generated, it is possible to transfer and share a widget or content. Accordingly, it is possible to configure a web browser-compatible instrument panel system in which various content configurations through an instrument panel and a personalized vehicle instrument panel configuration are possible by controlling various widgets and content to be transferred and shared between the user terminals in the vehicle instrument panel apparatus 100 which is represented in only simple analog or digital measuring instrument shapes whose number and forms are fixed in the related art. The converted widget or content may be stored in a memory.

In operation 530, the vehicle instrument panel apparatus 100 loads the instrument panel page to an overall screen of the instrument panel of a monitor form. That is, the widget and content are caused to be executed on the instrument panel screen.

In operation 540, the vehicle instrument panel apparatus 100 acquires measurement information from the measurement information acquiring apparatus. The received measurement information is stored temporarily or for a predetermined period.

In operation 550, the vehicle instrument panel apparatus 100 causes the measurement information to be represented on a screen obtained by combining the measurement information with the instrument panel page in which a specific widget or content is embedded.

In operation 560, the vehicle instrument panel apparatus 100 enables a unit measuring instrument, a measuring instrument combination, a vehicle state information/driving information UI, and the like to be transferred to and shared with a web browsing-enabled user terminal of another user or a related person. That is, the vehicle instrument panel apparatus 100 transmits a screen obtained by combining measurement information displayed on the screen with the instrument panel page to the user terminal, and adjusts a vehicle state displayed on the screen according to a control signal from the user terminal.

According to the examples of the present invention, it is possible to produce a web browser-compatible instrument panel system capable of dynamically configuring overall vehicle instrument panel contents and a design or UI arrangement in various forms by performing an operation of transferring and sharing a widget and application content necessary for driving preference, individual characteristics, and purpose of a vehicle driver or a related person with a mobile device anytime and anywhere when the vehicle instrument panel is configured with various widgets and content.

In addition, a unit measuring instrument, a measuring instrument combination, a vehicle state information/driving information UI, and the like represented on the screen of the vehicle instrument panel monitor are transferred to and shared with a web browsing-enabled mobile device of another user or a related person. In this case, because state information during traveling linked to the transferred and shared widget and application content is stored, the state information during the traveling may be used for the purpose of monitoring and safe driving.

The present invention can be implemented as computer readable codes in a computer readable record medium. The computer readable record medium includes all types of record media in which computer readable data is stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which the computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A vehicle instrument panel apparatus comprising:
a communication unit configured to receive a widget or content transmitted from one or more user terminals;
an instrument panel page constituted of a plurality of instrument panel containers in which the widget or content is embedded;
a converting unit configured to generate data capable of being embedded in the instrument panel containers according to a type of the received widget or content;
an execution unit configured to load the instrument panel page to a screen;
a sensing data acquiring unit configured to acquire measurement information input through one or more sensors; and
an interface unit configured to combine the measurement information acquired by the sensing data acquiring unit with the instrument panel page loaded by the execution unit, wherein the interface unit transmits the screen obtained by combining the measurement information displayed on the screen with the instrument panel page through communication unit so that the screen is shared with the one or more user terminal.

2. The instrument panel apparatus of claim 1, wherein the widget is a web application comprising at least one of a gasoline mileage representation application, a navigation application, a global positioning system (GPS) layout application, a speed/torque layout-related application, a vehicle revolutions per minute (RPM) application, and a safe driving-related warning application.

3. The instrument panel apparatus of claim 1, wherein the sensor is at least one of an RPM measurement sensor, a fuel level sensor, a gyro sensor, a GPS sensor, a coolant temperature sensor, an engine oil sensor, an acceleration sensor, a door open/close sensor, and a safe driving information acquiring unit.

4. The instrument panel apparatus of claim 1, wherein the interface unit adjusts a vehicle state displayed on the screen according to a control signal from the user terminal.

5. A method of controlling a vehicle instrument panel through sharing with a user terminal in a vehicle instrument panel apparatus, comprising:

receiving a widget or content transmitted from one or more user terminals;

performing conversion into data capable of being embedded in one or more instrument panel containers constituting an instrument panel page according to a type of the received widget or content;

loading the instrument panel page to a screen;

acquiring measurement information of the vehicle input through one or more sensors;

combining the acquired measurement information with the instrument panel page loaded to the screen: and transmitting the screen obtained by combining the measurement information displayed on the screen with the instrument panel page to the user terminal.

6. The method of claim 5, further comprising: adjusting a vehicle state displayed on the screen according to a control signal from the user terminal.

* * * * *